May 1, 1928.

T. P. MARTIN

GREASE CUP

Filed July 2, 1926

1,668,510

3 Sheets-Sheet 1

WITNESSES

INVENTOR
T. P. Martin,
BY
ATTORNEYS

May 1, 1928.
T. P. MARTIN
GREASE CUP
Filed July 2, 1926
1,668,510
3 Sheets-Sheet 2
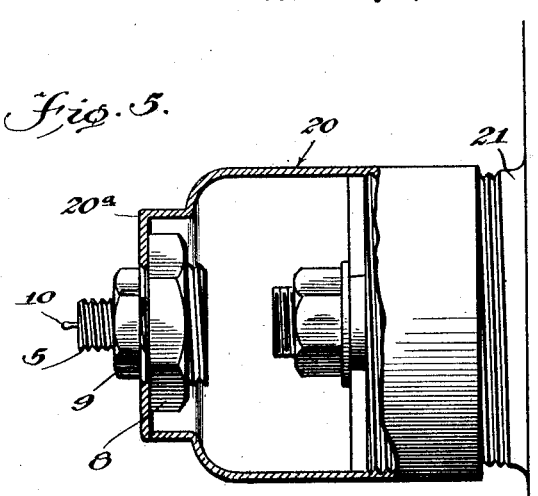
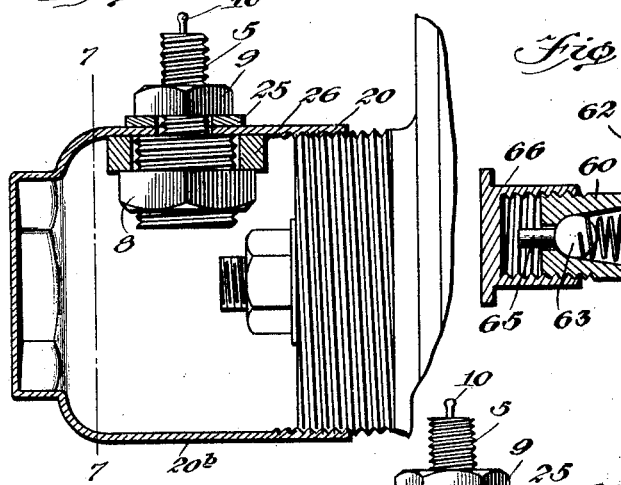
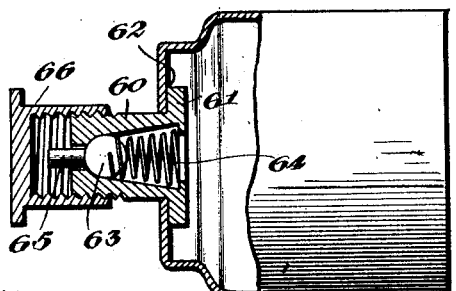
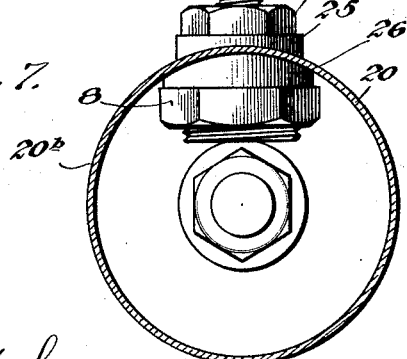
INVENTOR
T. P. Martin,
BY
ATTORNEYS May 1, 1928.
T. P. MARTIN
1,668,510
GREASE CUP
Filed July 2, 1926
3 Sheets-Sheet 3
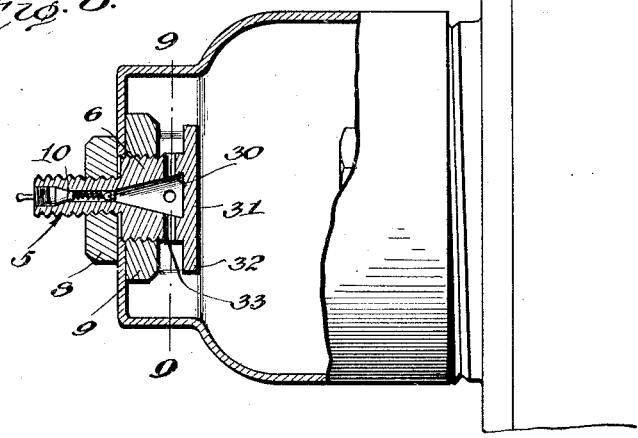
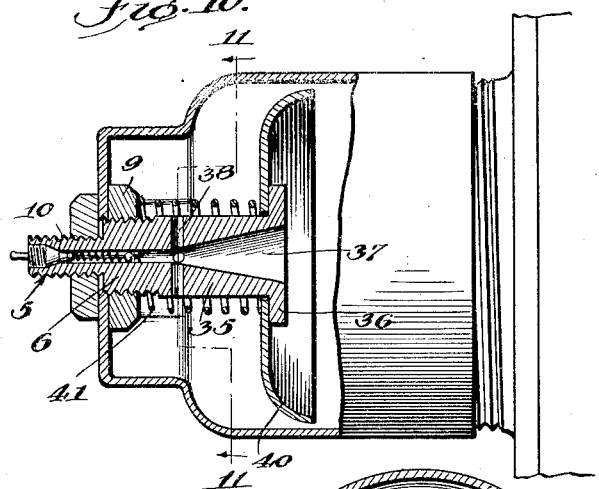
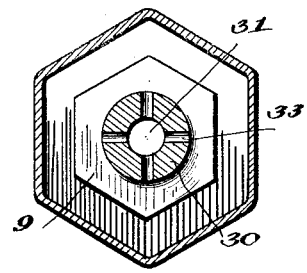
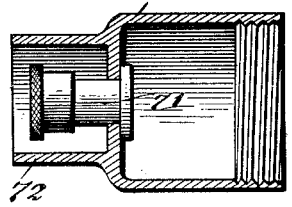
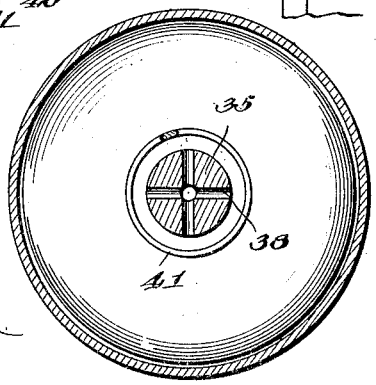
WITNESSES
INVENTOR
T. P. Martin,
BY
ATTORNEYS Patented May 1, 1928.

1,668,510

UNITED STATES PATENT OFFICE.

THOMAS P. MARTIN, OF OKLAHOMA CITY, OKLAHOMA.

GREASE CUP.

Application filed July 2, 1926. Serial No. 120,152.

This invention relates in general to lubricating means especially although not necessarily designed for use on automobiles and more particularly relates to an improved lubricating fitting which may take the form of a grease cup or cap such as a hub cap.

The object of the invention is to provide a device of this character which insures complete and entire lubrication of the parts of the machine upon which the device is mounted and yet the application and distribution of the lubricant is greatly facilitated. This advantage is had even though the machine which the lubricating device is on has been in use for a considerable time and some of the lubricant or grease has hardened in the passage ways of the part or parts to be lubricated.

A further object is to provide a device of these advantages and capacities and which is of simple and durable construction, reliable and effective in operation, and easy and comparatively inexpensive to manufacture.

Accordingly the present invention consists in its broader aspects of the provision of a lubricating fitting with a connection adapted to coact with an air chuck such as is used on the ordinary tire inflating hose, the connection having therein the usual check valve which is automatically opened when the chuck is applied to the connection and the air pressure presented thereto. Preferably in conjunction with the connection for applying air pressure to the fitting means is provided for distributing the air pressure so that it will actually be effective to carry the body of the grease through the passage and to the interstices between the part or parts to be lubricated. In conjunction with the means which permit the use of air to force the grease of the lubricant to the parts to be lubricated, mechanical means may be provided to sustain the feeding action while the machine is being used and yet this mechanical means permits the blowing out of the passages or parts to be lubricated and the forcing of new grease thereto when this is desired.

Figure 1:
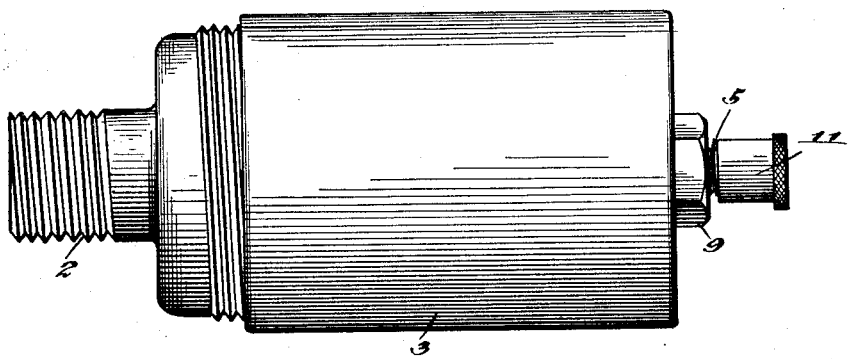
Figure 2:
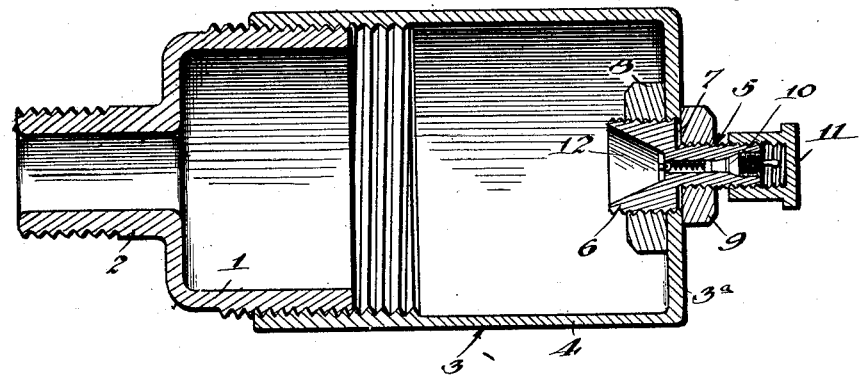
Figures 3, 4:
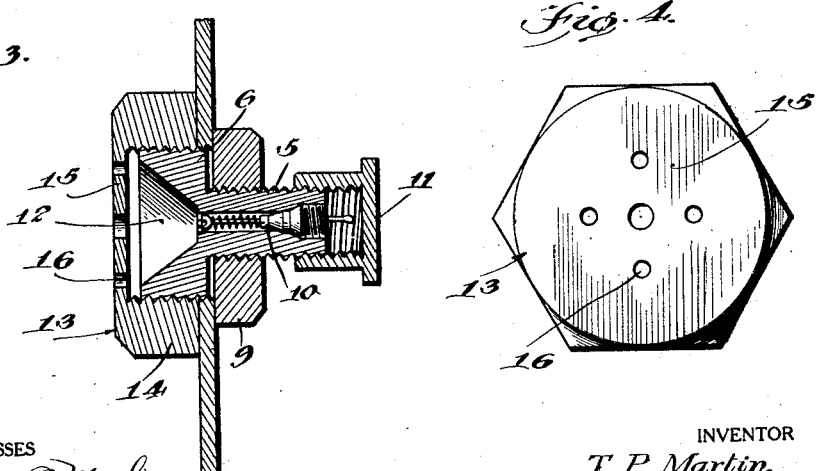

Other objects and advantages reside in the certain novel features of the construction and arrangement and combination of parts which will be hereinafter more fully described and particularly pointed out in the appended claims, reference being had to the accompanying drawings forming a part of the specification and in which:

Figure 1 is a view in elevation showing a grease cup embodying present invention, Figure 2 is a view in diametrical, longitudinal section further illustrating in the form of invention shown in Figure 1, Figure 3 is a fragmentary detailed sectional view showing a slight variation of the construction illustrated in Figures 1 and 2, Figure 4 is a view in elevation looking toward the left hand side of Figure 3, Figure 5 is a view partly in section and partly in elevation showing the invention applied to a hub cap, Figure 6 is a similar view showing a modification of the embodiment of the invention illustrated in Figure 5, Figure 7 is a view in transverse section on line 7—7 of Figure 6, Figure 8 is a view partly in section and partly in elevation showing another form of the invention as applied to a hub cap, Figure 9 is a view in transverse section on line 9—9 of Figure 8, Figure 10 is a view partly in section and partly in elevation showing still another form of the invention, Figure 11 is a sectional view on line 11—11 of Fig. 10, Figure 12 is a view partly in section and partly in elevation showing a different type of valve that may be employed, Figure 13 illustrates how the lubricating fitting may be protected.

Referring to the drawings and more particularly to Figures 1 and 2 the numeral 1 designates the tubular body of a grease cup, the body being externally threaded and having its outer end open and its inner end provided with a threaded nipple adapted to be screwed into the part to be lubricated. A cap 3 is provided for the grease cup and has the inner open end of its body portion 4 internally screw threaded and engaged with the threads of the body of the cup. The present invention proposes the provision of an air chuck connecting barrel 5 in the outer end plate 3ª of the cap 3. This barrel 5 has an enlarged rear end portion 6 which is received in an opening 7 provided in the end plate 3ª. A nut 8 is threaded on an enlarged portion 6 of the barrel and engages the inner face of the plate 3ª, the outer face of the plate 3ª being engaged by a nut 9 which is threaded on the main portion of barrel 5. From this it will be seen that the nuts 8 and 9 serve to clamp the barrel 5 in position with a portion of the barrel projecting thereinto. In the barrel 5 valve mechanism 10 is provided and is preferably of the type ordinarily used in the valve stems of the inner tubes of pneumatic tires. The outer end of the barrel 5 may be provided with a removable dust cap 11. In order to distribute the air, the enlarged portion 6 of the barrel is provided with a flaring discharge passage 12 which permits the air of the barrel to enlarge and widen out before acting on the grease.

The form of the invention shown in Figures 3 and 4 is very similar to that just described and the description of the embodiments shown in Figures 1 and 2 apply to the structure shown in Figures 3 and 4 except that the nut 8 is omitted in Figures 3 and 4 and is replaced by a combined nut and distributing plate designated generally at 13, said combined nut and distributing plate comprising an internally threaded body portion 14 engaging the portion 6 of the barrel and serving as a nut. Across the inner end of the body 14 an integral plate 14 extends and has a plurality of discharge ports 16 which permits the air to discharge against the grease in the form of a plurality of jets or streams. This distributing action of the plate 15 supplements the action of the flaring discharging passage 12.

In operation with both embodiments of the invention so far described the grease or lubricant is placed in the cup and also in the cap. The cap is then applied to the cup and if it is desirable to do so the air chuck is applied against the connection or barrel 5 thus forcing the grease to the parts to be lubricated.

In the event the cup has been in use for some time, the passages leading from the cup to the parts to be lubricated are liable to be and frequently do become clogged with hard grease. This hard grease can be readily blown out with the applicant's invention by applying the chuck of the ordinary tire filling hose to the barrel 5.

In the form of the invention shown in Figure 5 the invention is embodied in a hub cap 20 which is threadedly connected to the hub 21 of the wheel. In this form the barrel 5 containing the valve mechanism 10 is clamped to the outer end 20ª of the hub cap by means of the nuts 8 and 9. The grease is placed in the hub cap 20 prior to the assembly of the hub 21 and may be blown into the bearing of the wheel by applying an air chuck to barrel 5.

As shown in Figures 6 and 7 instead of placing the fitting in the end of the hub cap it can be conveniently mounted on the body portion 20ᵇ thereof and in this instance as in the other ones the nuts 8 and 9 are employed to clamp the barrel in position. In this instance however, it is necessary to employ elastic washers 25 which are shaped to compensate for the curvature of the body portion 20ᵇ.

In the embodiments of the invention shown in Figures 5, 6 and 7 the rotation of the fitting relative to the spindle of the axle serves to keep the grease plastic and to feed the same.

As shown in Figures 8 and 9 the rear portion of the barrel 5 may have an extension 30 provided with a closure plate 31 which projects beyond the periphery of the portion 6 to form an annular flange 32. In the extension 30ª a plurality of air discharging ports 33 are formed. It is only in this slightly different means for effecting the discharge of air in the barrel that the form of the invention shown in Figures 8 and 9 differs from that shown in Figure 5.

In the form of the invention shown in Figures 10 and 11 a barrel 5 is provided with an elongated cylindrical extension 35 beyond its externally threaded portion 6 and at the inner end of the extension 35 an outwardly directed marginal flange 36 is integrally formed. This extension 35 has a flaring discharge passage 37 which communicates with the passage of the barrel 5. In addition to the discharge passage 37 a plurality of discharge passages 38 may be provided if found desirable. This form of the invention contemplates not only the air for blowing the grease from the bearing and for clearing the clogged bearings, but also proposes a cup shaped feed disc 40 mounted for movement on the extension 35 and biased to move inwardly and against the flange 36 by means of a light coil spring 41, one end of which abuts the disc 40 while the other end thereof abuts the nut 9. The spring 41 is of such tension that it will not displace the disc when the grease is packed in the hub cap even though the spring 41 is fully compressed unless the grease is being churned or agitated as it is when the hub cap is on the wheel and the wheel is turning. At such time the movement of the disc relative to the spindle of the axle loosens up the grease and permits the spring 41 to slowly move the plunger 40 toward the axle spindle and therefore forcibly feed of the grease to the wheel bearing. Should the parts become clogged up, they can be readily blown out by applying the chuck of the tire filling hose to barrel 5 thereby subjecting the grease to the action of the air pressure.

It will thus be seen that pressure is not maintained but used only when actual greasing is necessary. At other times the natural flow produced by the turning of the spindle causes grease to be drawn into the spindle groove which flows therethrough owing to the fact that the valve allows a small quantity of air to always flow inward thereby relieving any vacuum and permitting such flow without air pressure being actually applied. The valve allows air to come into the hub cap where the grease is gradually pulled through and into the spindle groove thus producing a better flow of grease without any air pressure. Under present systems where the hub cap is always air tight it is difficult to get new grease into the spindle groove of the spindle due to the pullback of the vacuum in the outside end of the present hub cap.

It is to be understood that if desired the inner end of the flare discharge 37 of the extension 35 of the barrel may be covered by a perforated plate similar to the plate 15.

As shown in Figure 12 the cap of the grease cup or of the hub as the case may be may have a barrel 60 secured thereto in any suitable fashion. For instance, the barrel may have a flange 61 soldered or welded, as at 62, to the cap. Moreover, this barrel 60 may be adapted to have its passage controlled by a ball valve 63 urged against its seat by a spring 64 and having a stud 65 which adapts it to operate an air chuck. In other words an air chuck is applied to the outer end of the barrel. After the dust cap 66 has been removed the stud 65 will open the air chuck to permit the air to flow in through the opening or passage of the barrel 60, the ball valve 63 having been unseated by the co-action of the stud 65 with the air chuck.

Figure 3 illustrates that the cap of the grease cup or hub which is designated at 70 may have suitable protecting means for the lubricating fitting, designated generally at 71. This protecting means may take the form of an annular flange 72 or a series of lugs. In any event the protecting means is adapted to receive and absorb impacts and protect the lubricating fitting 71 from damage. This lubricating fitting 71 may embody any one of the several embodiments of the invention hereinabove described.

While the air pressure used in this device will finally make a hole through the grease after greasing has been finished, this hole will be closed by the first revolution of the hub cap on the wheel. Where the top or grease cup, as shown in Fig. 1 and also in Fig. 10 is stationary, the hole will be made after greasing and stay only a short while until gravity, heat or other means will cause the grease to again spread out and close the hole. This invention is a cleaner first and then a greaser. It economizes in grease, removes dirt, is economical, and easy to handle.

I claim:

1. A lubricating fitting having a cap and comprising a barrel opening through one end of the cap and adapted to receive an air chuck and having valve mechanism therein, and means for securing the barrel to the cap, said barrel having its discharge end opening into the cap to discharge air into the cap and cause it to pass through the grease.

2. A lubricating fitting having a cap and comprising a barrel adapted to receive an air chuck and having valve mechanism therein and means for securing the barrel to the cap, said barrel having its discharge end opening into the cap, the interior of the barrel flaring towards its discharge end to discharge the blast of air.

3. A lubricating fitting having a cap and comprising a barrel adapted to receive an air chuck and having valve mechanism therein and means for securing the barrel to the cap, said barrel having its discharge end opening into the cap and means on the barrel for distributing the air over the grease.

4. A lubricating fitting having a cap and comprising a barrel adapted to receive an air chuck and having valve mechanism therein and means for securing the barrel to the cap, said barrel having its discharge end opening into the cap and means on the barrel for distributing the air over the grease and comprising a perforated plate located at the inner end of the barrel.

5. A lubricating fitting having a cap and comprising a barrel, the cap having an opening receiving the barrel, a portion of the barrel projecting into the cap and a portion of the barrel projecting outside the cap, nuts threadedly engaged with the barrel and having clamping engagement with the cap to hold the barrel in position, said barrel having its outer end adapted to have an air chuck applied thereto, said barrel having valve mechanism therein and having its inner end discharging into the cap.

6. A lubricating fitting having a cap and comprising a barrel, the cap having an opening receiving the barrel, a portion of the barrel projecting into the cap and a portion engaged with the barrel, nuts threaded on the barrel and having clamping engagement with the cap to hold the barrel in position, said barrel having its outer end adapted to have an air chuck applied thereto, said barrel having valve mechanism therein and having its inner end discharging into the cap, and means at the inner end of the barrel for distributing the air over the grease.

7. A lubricating fitting having a cap and comprising a barrel adapted to receive an air chuck and having valve mechanism therein, means for mounting the barrel on the cap, said barrel having a portion located within the cap, a feed disc slidably mounted on the portion located in the cap, means for pressing the feed disc inwardly, and means for limiting the inward movement of the disc.

THOMAS P. MARTIN.